US011859760B2

(12) United States Patent
Lin

(10) Patent No.: US 11,859,760 B2
(45) Date of Patent: Jan. 2, 2024

(54) HANGING DEVICE

(71) Applicant: Chicony Electronics Co., Ltd., New Taipei (TW)

(72) Inventor: Chang-Yi Lin, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 66 days.

(21) Appl. No.: 17/834,094

(22) Filed: Jun. 7, 2022

(65) Prior Publication Data
US 2023/0132827 A1 May 4, 2023

(30) Foreign Application Priority Data
Oct. 28, 2021 (TW) ................................. 110140166

(51) Int. Cl.
F16M 13/02 (2006.01)
(52) U.S. Cl.
CPC .................................. F16M 13/02 (2013.01)
(58) Field of Classification Search
CPC ........ F16M 11/00; F16M 13/00; F16M 13/02; G08B 3/1058; G03B 17/561; G10K 1/26
See application file for complete search history.

(56) References Cited

U.S. PATENT DOCUMENTS

| 2,682,655 | A | * | 6/1954 | Grohsgal | G10K 1/26 340/392.5 |
| 6,549,109 | B1 | * | 4/2003 | Yang | G10K 1/062 340/398.2 |
| 8,792,251 | B2 | * | 7/2014 | Shih | F16M 13/02 361/807 |
| 9,823,551 | B2 | * | 11/2017 | Adervall | H04N 23/51 |
| 10,490,041 | B1 | * | 11/2019 | Churak | H05K 5/03 |
| 10,506,205 | B2 | * | 12/2019 | Siminoff | H04R 1/028 |
| 11,373,819 | B2 | * | 6/2022 | Chiu | H01H 13/14 |
| 11,538,314 | B2 | * | 12/2022 | Chen | G08B 3/1058 |
| 11,609,485 | B2 | * | 3/2023 | Boyes | F16M 11/2014 |
| 2022/0270449 | A1 | * | 8/2022 | Thorne | G08B 3/10 |

FOREIGN PATENT DOCUMENTS

| CA | 2857296 A1 | * | 1/2015 | ............ B60R 11/04 |
| CN | 109424837 A |   | 3/2019 |  |
| WO | WO-2021081538 A1 | * | 4/2021 | ............ F16M 13/02 |

* cited by examiner

Primary Examiner — Eret C McNichols
(74) Attorney, Agent, or Firm — MUNCY, GEISSLER, OLDS & LOWE, P.C.

(57) ABSTRACT

A hanging device includes a wall fixing plate, a wall hanging element, and a spiral spring. The wall fixing plate includes a fixing portion, an abutting portion, and a first fitting portion. The wall hanging element includes a housing and a fixing member. The housing has a back surface, and the back surface has a second fitting portion and a spring installation region. The spiral spring is disposed in the spring installation region and includes an inner arc section, an outer arc section, and an arc connecting section.

14 Claims, 7 Drawing Sheets

HANGING DEVICE

CROSS-REFERENCE TO RELATED APPLICATION

This non-provisional application claims priority under 35 U.S.C. § 119(a) to Patent Application No. 110140166 filed in Taiwan, R.O.C. on Oct. 28, 2021, the entire contents of which are hereby incorporated by reference.

BACKGROUND

Technical Field

The instant disclosure relates to a hanging device, in particular, to hanging device with a spiral spring.

Related Art

Many products tend to be hung on the wall surface in order to save space, to improve aesthetic feelings, to increase safety, or to achieve other requirements upon using the products. For example, a surveillance camera may be hung on the wall surface of different places (e.g., a kinder garden, an office, or a store), thus the surveillance camera can be a communication media between the indoor space and the outdoor space. Moreover, in another example, a doorbell device may be assembled on the wall surface at the entrance or exit of a building (which may be a residence, an office, or a commercial building), so that the doorbell device can perform the security surveillance function or record personnel activities.

SUMMARY

In general, in order to prevent the product from falling off the wall surface, upon assembling a wall-hanging product known to the inventor, a plate is firstly fixed on the wall surface, and the product is then locked on the plate with bolts. As a result, upon assembling the product on the wall or detaching the product from the wall, a hand tool is applied to rotate the bolts which is timing consuming and inconvenient. Moreover, the space between the product and the plate is very narrow, thus further increasing the difficulty upon assembling the product on the wall or disassembling the product from the wall.

In view of this, in one embodiment, a hanging device is provided. The hanging device comprises a wall fixing plate, a wall hanging element, and a spiral spring. The wall fixing plate comprises a fixing portion, an abutting portion, and a first fitting portion. The wall hanging element comprises a housing and fixing member. The housing has a back surface. The back surface has a spring installation region and a second fitting portion. The second fitting portion is detachably fitted with the first fitting portion. The fixing member protrudes from the back surface and is detachably assembled on the fixing portion. A distance between the fixing member and a bottom edge of the spring installation region is greater than a distance between the fixing portion and the abutting portion of the wall fixing plate. The spiral spring is disposed in the spring installation region. The spiral spring comprises an inner arc section, an outer arc section, and an arc connecting section. A radius of the outer arc section is greater than a radius of the inner arc section, the arc connecting section is connected between the inner arc section and the outer arc section, and a radius of curvature of the arc connecting section gradually increases from the inner arc section to the outer arc section.

Based on the above, in the hanging device according to one or some embodiments of the instant disclosure, the wall hanging element can be quickly assembled on the wall fixing plate through the fixing member and the second fitting portion. Furthermore, after the fixing member is detached from the wall fixing plate, the elastic force stored in the spiral spring drives the wall hanging element to move with respect to the wall fixing plate, so that the wall hanging element can be detached from the wall fixing plate easily and conveniently. Moreover, when the spiral spring is compressed, the inner stress applied to the spiral spring can be distributed over the entire spring properly, thereby increasing the yield strength and the service life of the spiral spring. Furthermore, owing to the snail-like structure of the spiral spring, after the spiral spring is released, the spiral spring can have a longer actuation movement to provide a greater elastic force. Hence, even in a narrow space, the elastic force generated by the spiral spring and the actuation movement of the spiral spring can be ensured enough to drive the wall hanging element to move from the fixed position to the released position.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
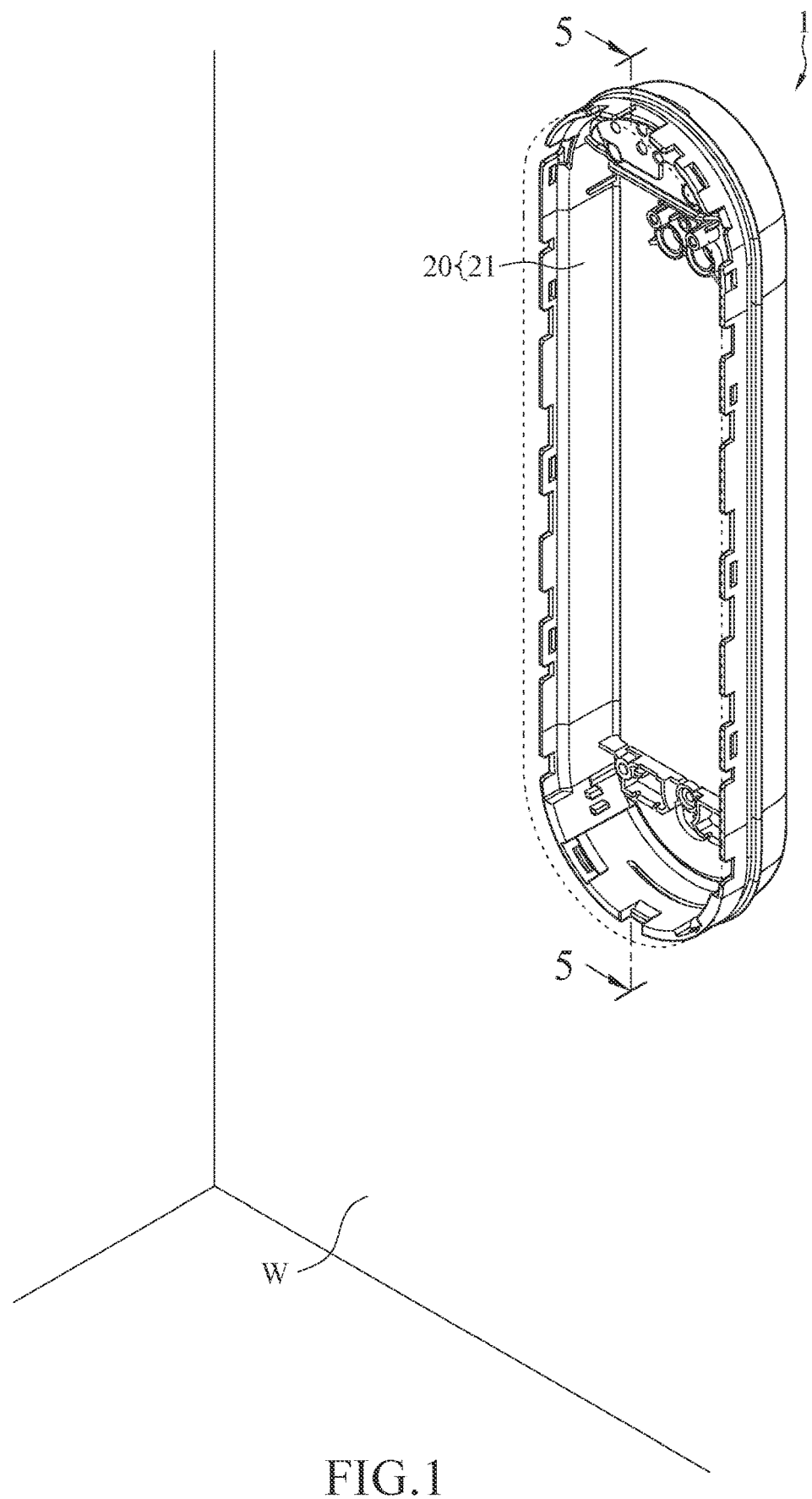
FIG. 1 illustrates a perspective view of a hanging device according to an exemplary embodiment of the instant disclosure.
Figure 2:
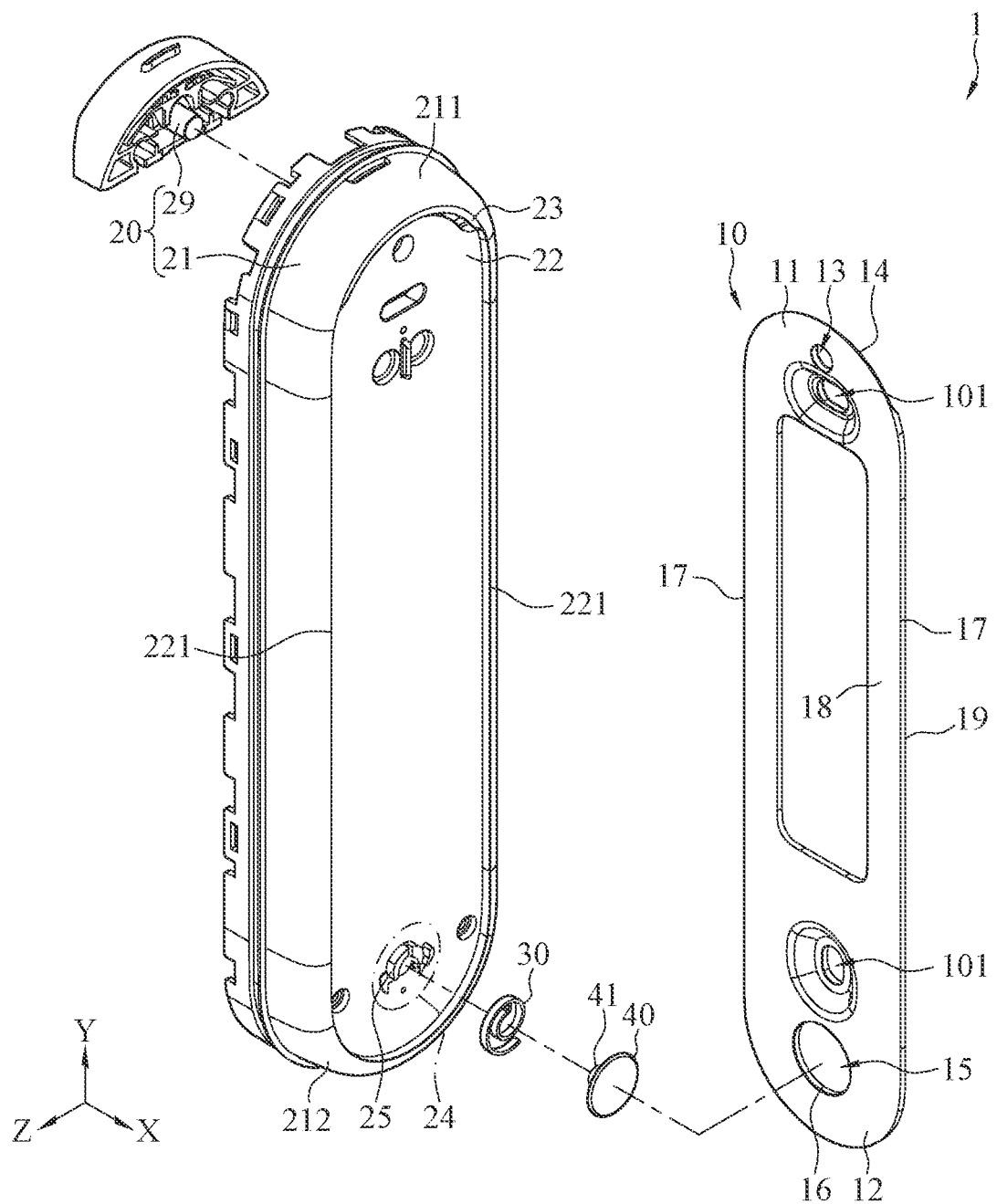
FIG. 2 illustrates an exploded view of the hanging device of the exemplary embodiment.

FIG. 1 illustrates a perspective view of a hanging device according to an exemplary embodiment of the instant disclosure. FIG. 2 illustrates an exploded view of the hanging device of the exemplary embodiment. As shown in FIG. 1 and FIG. 2, the hanging device 1 comprises a wall fixing plate 10, a wall hanging element 20, and a spiral spring 30. The wall fixing plate 10 is adapted to be fixed on a wall surface W. For example, in this embodiment, the wall fixing plate 10 has two lock holes 101, so that the wall fixing plate 10 can be locked on the wall surface W through bolts, but embodiments are not limited thereto. In some embodiments, the wall fixing plate 10 may be fixed on the wall surface W through other manners (such as attaching or riveting). In some embodiments, the wall surface W may be the surface of the wall, the surface of the ceiling, or the surface of any articles.

As shown in FIG. 1 and FIG. 2, in this embodiment, the wall fixing plate 10 comprises a top portion 11, a bottom portion 12, a fixing portion 13, a first fitting portion 14, and an abutting portion 16. The fixing portion 13 and the abutting portion 16 are between the top portion 11 and the bottom portion 12. In this embodiment, the fixing portion 13 is a through hole adjacent to the top portion 11, and the abutting portion 16 is adjacent to the bottom portion 12. The wall fixing plate 10 has a via hole 15. The via hole 15 is adjacent to the bottom portion 12 and is defined through two opposite surfaces of the wall fixing plate 10. The abutting portion 16 may be the hole edge of the via hole 15 to abut against the spiral spring 30. As shown in FIG. 2, the two opposite surfaces of the wall fixing plate 10 are respectively a front surface 18 and a rear surface 19.

However, it is understood that, the foregoing embodiments are illustrative examples. In some embodiments, the fixing portion 13 of the wall fixing plate 10 may be a slot and not defined through the two opposite surfaces of the wall fixing plate 10, and the abutting portion 16 may be a protruding flange disposed on the surface of the wall fixing plate 10.

As shown in FIG. 1 and FIG. 2, the wall hanging element 20 may be any product which has to be hung on. For example, the wall hanging element 20 may be a surveillance camera, a doorbell, a remote controller, a charger, or the like. The wall hanging element 20 comprises a housing 21 and a fixing member 29. The housing 21 has a back surface 22. The back surface 22 has a second fitting portion 23 and a spring installation region 24, and the housing 21 further has a top end 211 and a bottom end 212. The second fitting portion 23, the spring installation region 24, and the fixing member 29 may be disposed on any portion between the top end 211 and the bottom end 212. For example, in this embodiment, the second fitting portion 23 and the fixing member 29 are adjacent to the top end 211 and respectively correspond to the first fitting portion 14 and the fixing portion 13, and the spring installation region 24 is adjacent to the bottom end 212 and corresponds to the abutting portion 16, but embodiments are not limited thereto.

As shown in FIG. 2, the fixing member 29 is disposed in the housing 21 and shiftably protrudes from the back surface 22. Please refer to FIG. 5. In this embodiment, the fixing member 29 comprises an elastic member 291 and a rod member 292. Moreover, in this embodiment, the elastic member 291 is an elastic arm, but embodiments are not limited thereto; in some embodiments, the elastic member 291 may be a spring, an elastic piece, or an elastic rubber. One of two ends of the elastic member 291 is connected to other parts inside the housing 21, and the other end of the elastic member 291 is connected to and pushes against the rod member 292 to protrude from the back surface 22 of the housing 21. Therefore, when the rod member 292 is forced by the elastic member 291, the rod member 292 is in a movable and shiftable state so as to protrude from the back surface 22 or not to protrude from the back surface 22. The spring installation region 24 of the housing 21 is a region on the back surface 22 for assembling with the spiral spring 30 (for example, in FIG. 2, the region enclosed by the dot-and-dash line). The spring installation region 24 has a limiting member 25 for assembling with the spiral spring 30. Moreover, a distance (in this embodiment, the distance in the Y-axis direction) between the fixing member 29 and the bottom edge of the spring installation region 24 is greater than a distance (in this embodiment, the distance in the Y-axis direction) between the fixing portion 13 and the abutting portion 16 of the wall fixing plate 10.

Further, as shown in FIG. 2, the second fitting portion 23 on the back surface 22 of the housing 21 is provided for being fitted with the first fitting portion 14 of the wall fixing plate 10. For example, the first fitting portion 14 and the second fitting portion 23 may be fitted with each other through clearance fit, interference fit, transition fit, or the like. In this embodiment, the first fitting portion 14 is the edge portion of the top portion 11 of the wall fixing plate 10 (in this embodiment, an arc edge), and the second fitting portion 23 is a buckling flange disposed on the back surface 22. Moreover, in this embodiment, the second fitting portion 23 is an arc flange, and the shape of the arc flange corresponds to the shape of the first fitting portion 14, so that the second fitting portion 23 can be fitted with the first fitting portion 14 of the wall fixing plate 10.

Figure 3:
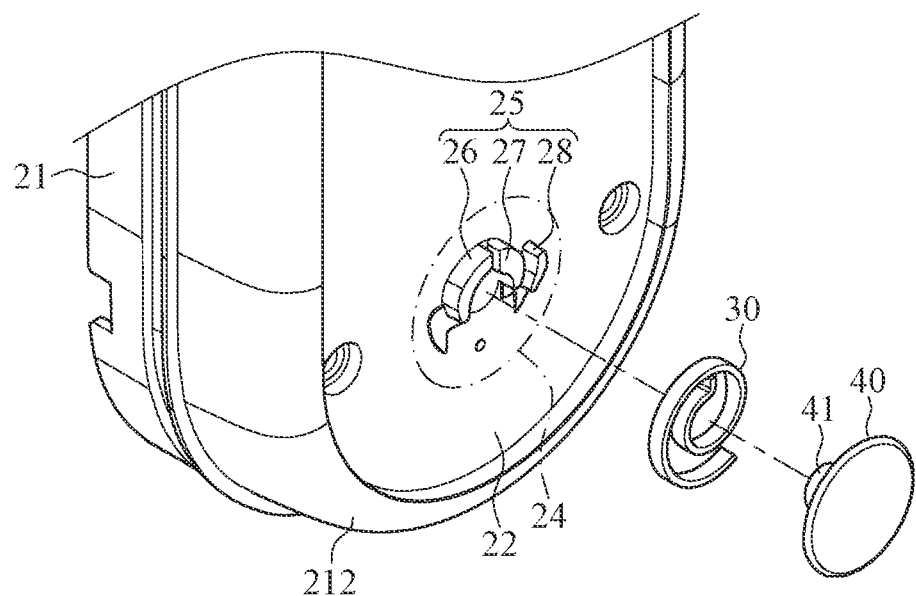
FIG. 3 illustrates an enlarged partial exploded view of the hanging device of the exemplary embodiment.
Figure 4:
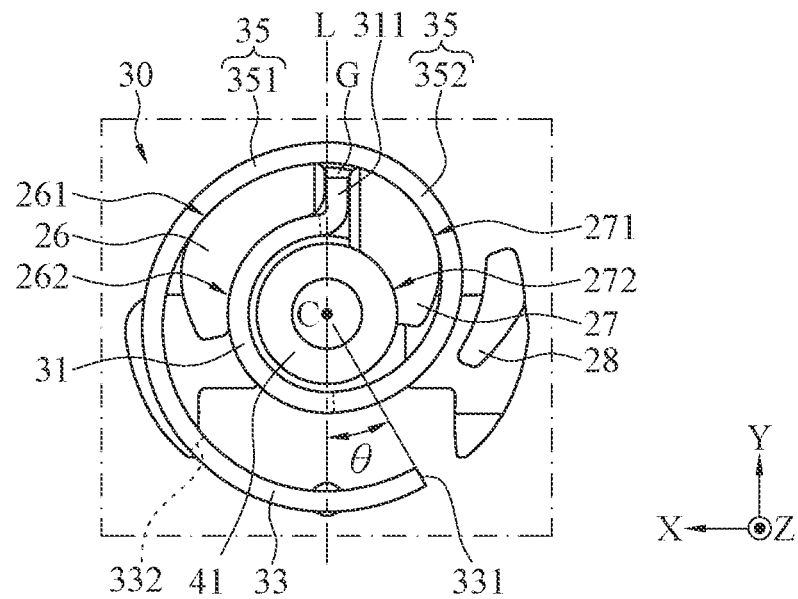
FIG. 4 illustrates an enlarged partial plan view of the hanging device of the exemplary embodiment.

FIG. 3 illustrates an enlarged partial exploded view of the hanging device of the exemplary embodiment. FIG. 4 illustrates an enlarged partial plan view of the hanging device of the exemplary embodiment. As shown in FIG. 2 to FIG. 4, the spiral spring 30 is formed by winding a wire, from the inside out, into a spiral structure. In some embodiments, the wire may be flat wire or a plat-shaped wire. The material of the wire may be carbon steel, alloy steel, stainless steel, or other metal alloys, but embodiments are not limited thereto.

As shown in FIG. 2 to FIG. 4, the spiral spring 30 is disposed on the spring installation region 24 and comprises an inner arc section 31, an outer arc section 33, and an arc connecting section 35. The inner arc section 31, the outer arc section 33, and the arc connecting section 35 may be arranged on a same plane. Moreover, a radius of the outer arc section 33 is greater than a radius of the inner arc section 31. For example, the radius of the outer arc section 33 may be 1.5 to 2.5 times of the radius of the inner arc section 31. The arc connecting section 35 is connected between the inner arc section 31 and the outer arc section 33. Specifically, in this embodiment, the inner arc section 31 is an initial section of the spiral spring 30 which has the smallest radius of curvature, and the outer arc section 33 is a terminal section of the spiral spring 30 which has the largest radius of curvature. The radius of curvature of the arc connecting section 35 gradually increases from the inner arc section 31 to the outer arc section 33, so that the spiral spring 30 forms a continuous spiral line segment (as shown in FIG. 4).

It is understood that, in FIG. 4 the dash line on the spiral spring 30 is provided for indicating the borders among the inner arc section 31, the outer arc section 33, and the arc connecting section 35, but not for limiting the arc length of the inner arc section 31, the arc length of the outer arc section 33, and the arc length of the arc connecting section 35 to a certain embodiment. In some embodiments, the inner arc section 31 of the spiral spring 30 may be a circular arc, and the central angle of the inner arc section 31 may be in a range between 45 degrees and 210 degrees. For example, in the embodiment shown in FIG. 4, the central angle of the inner arc section 31 is about 180 degrees, but embodiments are not limited thereto. In some embodiments, the inner arc section 31 may be configured as a non-circular arc and has an incremental radius of curvature. Similarly, the outer arc section 33 of the spiral spring 30 may be a circular arc, and the central angle of the outer arc section 33 is in a range between 45 degrees and 210 degrees. For example, in the embodiment shown in FIG. 4, the central angle of the outer arc section 33 is about 75 degrees, but embodiments are not limited thereto. In some embodiments, the outer arc section 33 may be configured as a non-circular arc and has an incremental radius of curvature.

As shown in FIG. 2 to FIG. 4, the spiral spring 30 leans against the limiting member 25 on the spring installation region 24. The limiting member 25 comprises at least one block protruding from the back surface 22 and between the arc connecting section 35 and the inner arc section 31, so that the arc connecting section 35 and the inner arc section 31 respectively lean against the block, thereby limiting the movement of the spiral spring 30. In this embodiment, the limiting member 25 comprises a first limiting block 26 and a second limiting block 27 spacedly arranged along the X-axis direction. The first limiting block 26 has a first top edge 261 and a first bottom edge 262. The first top edge 261 is nearer to the top end 211 of the housing 21, as compared with the first bottom edge 262 (in other words, in this embodiment, a distance between the first top edge 261 and the top end 211 of the housing 21 is less than a distance between the first bottom edge 262 and the top end 211 of the housing 21). The second limiting block 27 has a second top edge 271 and a second bottom edge 272. The second top edge 271 is nearer to the top end 211 of the housing 21, as compared with the second bottom edge 272 (in other words, in this embodiment, a distance between the second top edge 271 and the top end 211 of the housing 21 is less than a distance between the second bottom edge 272 and the top end 211 of the housing 21). Moreover, an indentation G is between the first limiting block 26 and the second limiting block 27. In this embodiment, the first limiting block 26 and the second limiting block 27 are spaced arranged with each other to form the indentation G.

Furthermore, as shown in FIG. 4, the arc connecting section 35 of the spiral spring 30 leans against the first top edge 261 and the second top edge 271, and the inner arc section 31 leans against the first bottom edge 262. Moreover, an end portion of the inner arc section 31 has an extension section 311, and the inner arc section 31 is connected between the extension section 311 and the arc connecting section 35. In this embodiment, the extension section 311 integrally extends and bends from the end portion of the inner arc section 31, and the extension section 311 is inserted into the indentation G. Accordingly, in this embodiment, since the arc connecting section 35 leans against the first top edge 261 and the second top edge 271 as well as the inner arc section 31 leans against the first bottom edge 262, the arc connecting section 35 is limited from moving downwardly and the inner arc section 31 is limited from moving upwardly. Hence, the upward and downward movements of the spiral spring 30 are limited. Moreover, since the extension section 311 is inserted into the indentation G, the leftward and rightward movements of the spiral spring 30 are also limited. The outer arc section 33 of the spiral spring 30 is not limited, so that the outer arc section 33 can be forced to move toward the inner arc section 31 radially.

As shown in FIG. 4 again, the first bottom edge 262 of the first limiting block 26 may be an arc edge, and the radius of curvature of the first bottom edge 262 corresponds to the radius of curvature of the inner arc section 31, so that the leaning area between the inner arc section 31 and the first bottom edge 262 increases to provide a better limiting performance. The first top edge 261 of the first limiting block 26 and the second top edge 271 of the second limiting block 27 may be arc edges respectively. The arc connecting section 35 comprises a first arc section 351 and a second arc section 352, and the radius of curvature of the first arc section 351 is greater than the radius of curvature of the second arc section 352. The first arc section 351 leans against the first top edge 261, and the radius of curvature of the first top edge 261 corresponds to the radius of curvature of the first arc section 351. The second arc section 352 leans against the second top edge 271, and the radius of curvature of the second top edge 271 corresponds to the radius of curvature of the second arc section 352. Therefore, the leaning area between the first arc section 351 and the first top edge 261 as well as the leaning area between the second arc section 352 and the second top edge 271 can be increased to provide a better limiting performance.

Figure 5:
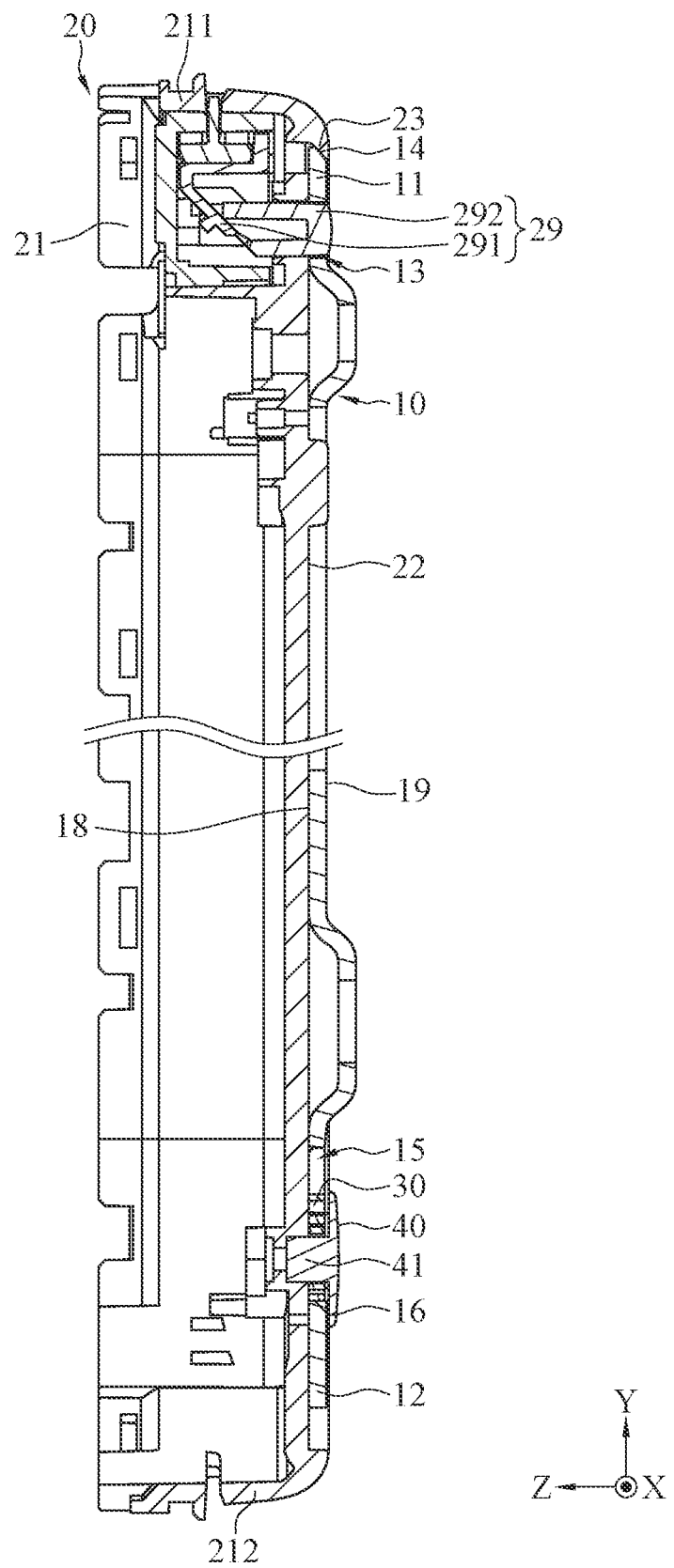
FIG. 5 illustrates a cross-sectional view of the wall hanging element at the fixed position along line 5-5 shown in FIG. 1.
Figure 6:
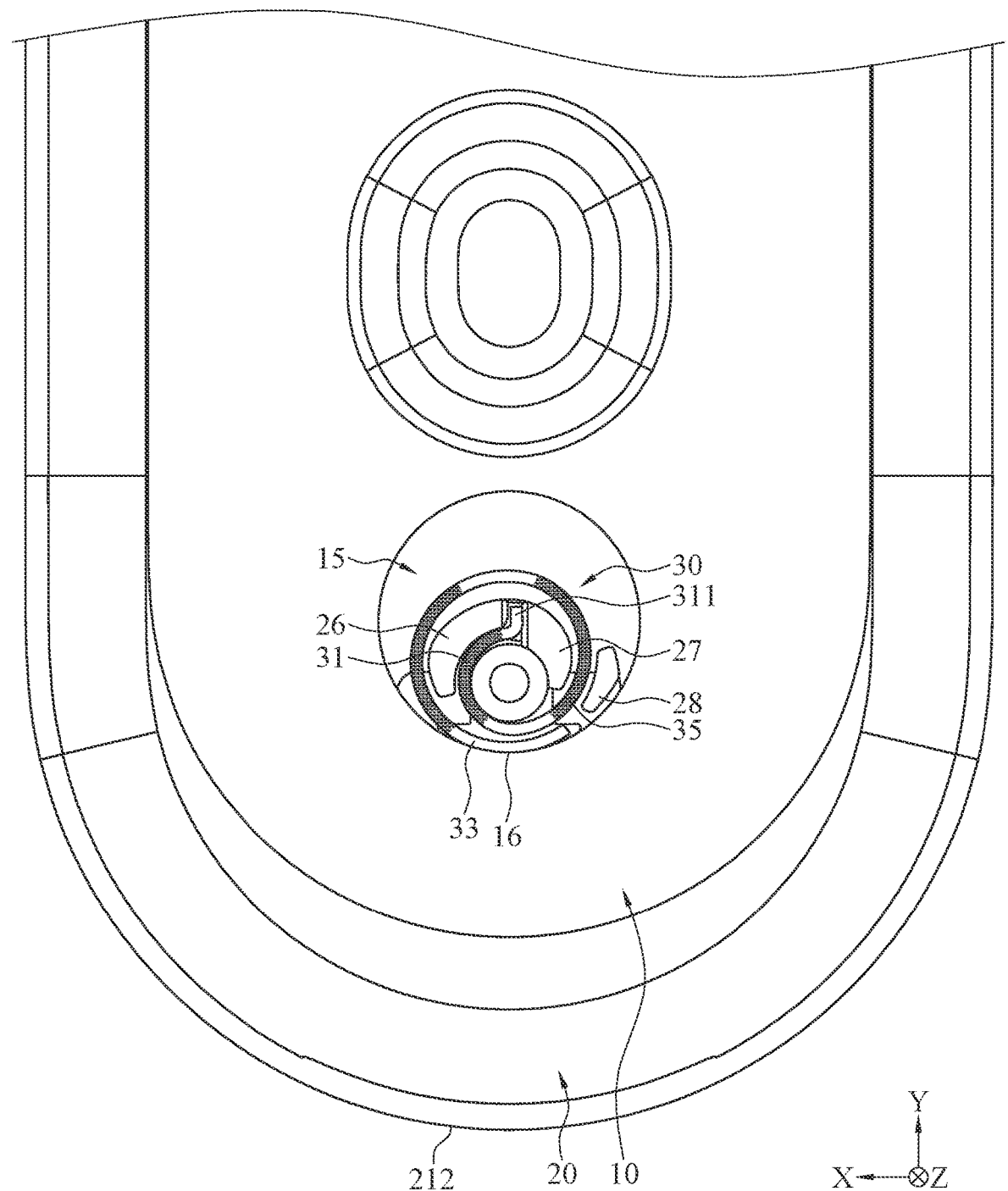
FIG. 6 illustrates an enlarged partial plan view of the wall hanging element at the fixed position.
Figure 7:
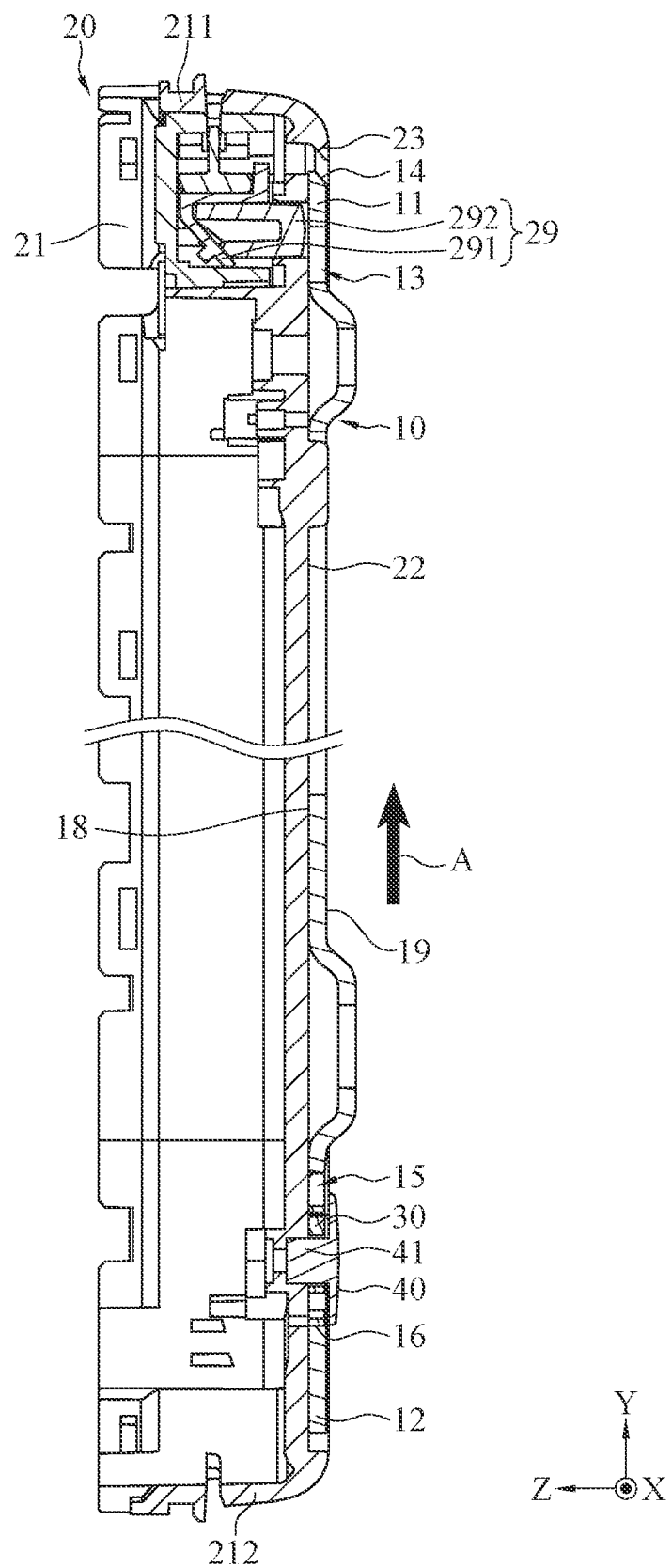
FIG. 7 illustrates a cross-sectional view of the wall hanging element at the released position.

FIG. 5 illustrates a cross-sectional view showing that the wall hanging element is at the fixed position along the line 5-5 shown in FIG. 1. FIG. 6 illustrates an enlarged partial view showing that the wall hanging element is at the fixed position. As shown in FIG. 5 and FIG. 6, the wall hanging element 20 can be assembled on the wall fixing plate 10 and at a fixed position (as the position shown in FIG. 5). For example, during assembling the wall hanging element 20 on the wall fixing plate 10, the spiral spring 30 is inserted into the via hole 15 of the wall fixing plate 10 (at this moment, the spiral spring 30 does not abut against the abutting portion 16), so that the second fitting portion 23 of the housing 21 is above the first fitting portion 14 and the fixing member 29 abuts against the surface of the wall fixing plate 10 (as shown in FIG. 7). Next, the wall hanging element 20 can be moved to the fixed position based on the gravity force or user operation, so that the fixing member 29 is buckled with and assembled in the fixing portion 13 and the second fitting portion 23 is fitted with the first fitting portion 23. Therefore, the wall hanging element 20 is fixed on the wall fixing plate 10 and hung on the wall surface.

Furthermore, as shown in FIG. 5 and FIG. 6, when the wall hanging element 20 is moved to the fixed position, the abutting portion 16 (in this embodiment, the hole edge of the via hole 15) pushes the outer arc section 33 of the spiral spring 30 to move toward the inner arc section 31. Therefore, the spiral spring 30 is compressed to store the elastic force. In this embodiment, the outer arc section 33 is nearer to the bottom end 212 of the housing 21, as compared with the inner arc section 31; in other words, in this embodiment, the distance between the outer arc section 33 and the bottom end 212 of the housing 21 is less than the distance between the inner arc section 31 and the bottom end 212 of the housing 21. When the wall hanging element 20 is moved to the fixed position, the abutting portion 16 pushes the outer arc section 33 of the spiral spring 30 to move toward the top end 211 of the housing 21 (that is, in this embodiment, along the Y-axis direction) to come toward the inner arc section 31. Therefore, the outer arc section 33 is compressed toward the inner arc section 31 to further drive the arc connecting section 35 and the inner arc section 31 to have elastic deformation to store the elastic force. Moreover, when the outer arc section 33 of the spiral spring 30 is released, the elastic force stored in the spiral spring 30 can provide a force along the Y-axis direction. Accordingly, in one or some embodiments of the instant disclosure, owing to the snail-like structure of the spiral spring 30 and the operation of the spiral spring 30, the internal stress in the spiral spring 30 can be distributed over the whole spring when the spiral spring 30 is compressed. For example, as shown in FIG. 6, when the spiral spring 30 is compressed, several sections of the spiral spring 30 (such as the sections filled with dots shown in FIG. 6) together suffer the internal stress, thereby increasing the yield strength of the spiral spring 30. Therefore, the spiral spring 30 can sustain the weight of the wall hanging element 20 to prevent from the breaking of the spiral spring 30 due to fatigue, thus increasing the service life of the spiral spring 30.

Figure 8:
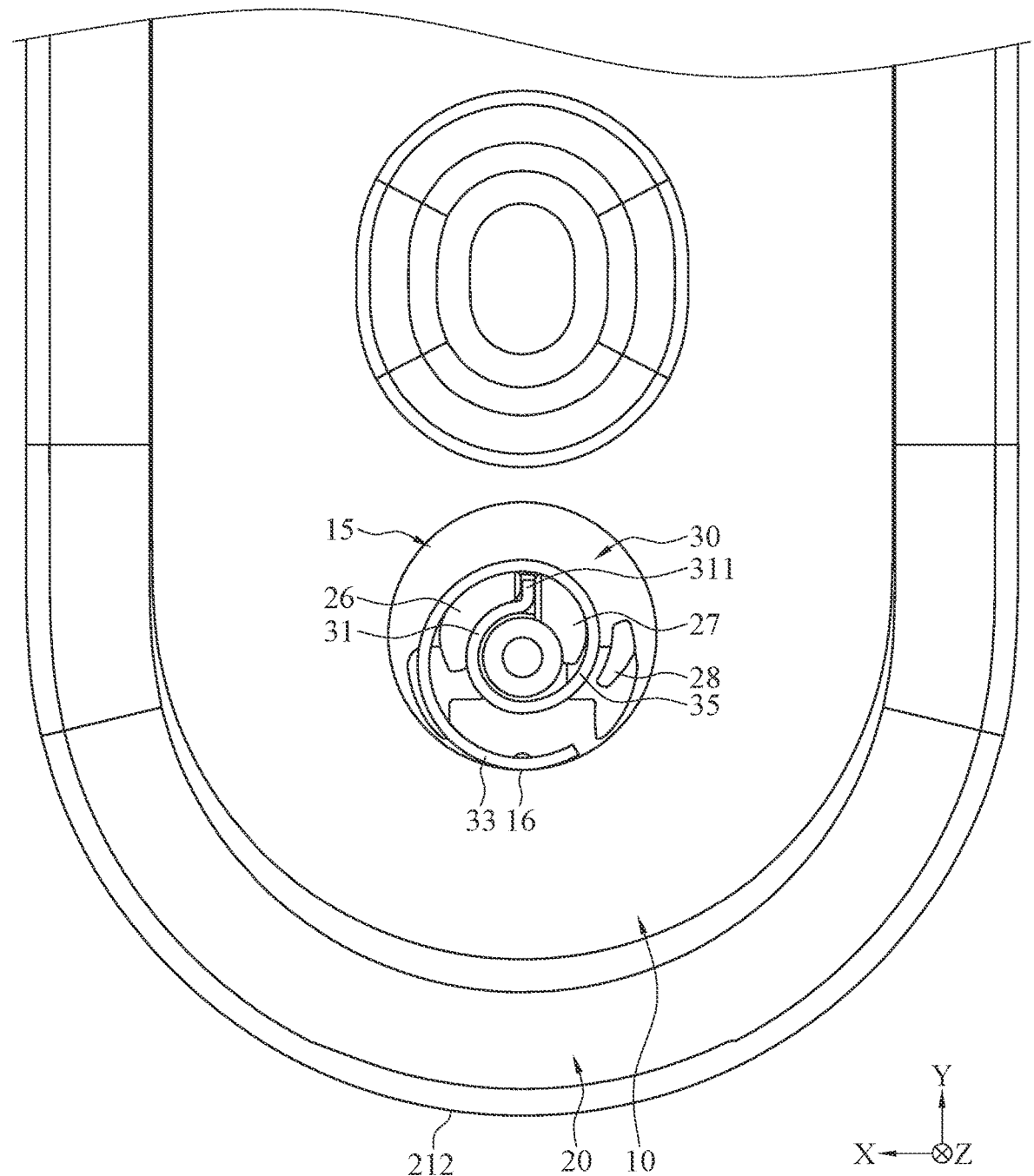
FIG. 8 illustrates an enlarged partial plan view of the wall hanging element at the released position.

FIG. 7 illustrates a cross-sectional view showing that the wall hanging element is at the released position. FIG. 8 illustrates an enlarged partial plan view showing that the wall hanging element is at the released position. As shown in FIG. 7 and FIG. 8, when the wall hanging element 20 is to be detached off, the user can operate the fixing member 29 to be detached from the fixing portion 13. For example, the user can operate the fixing member 29 to be detached from the fixing portion 13 by hands or by hand tools. Then, the elastic force stored in the spiral spring 30 thus drive the wall hanging element 20 to move toward the top portion 11 of the wall fixing plate 10 to a released position (as indicated in FIG. 7) along the Y-axis direction (as the arrow A shown in FIG. 7). Specifically, in this embodiment, when the wall hanging element 20 is moved from the fixed position to the released position, the second fitting portion 23 of the wall hanging element 20 can be moved upwardly to detach from the first fitting portion 14 of the wall fixing plate 10. Hence, at this moment, the wall hanging element 20 is not fixed and can be detached from the wall fixing plate 10 easily. Moreover, according to one or some embodiments of the instant disclosure, after the spiral spring 30 is released, the actuation movement of the spiral spring 30 is long, thus providing a higher elastic force. Therefore, even in a narrow space (for example, in the space of the via hole 15, where the thickness of the via hole 15 is approximately the thickness of the wall fixing plate 10), the elastic force generated by the spiral spring 30 and the actuation movement of the spiral spring 30 can be ensured enough to drive the wall hanging element 20 to move from the fixed position to the released position.

As shown in FIG. 2, in this embodiment, the back surface 22 of the housing 21 further comprises two side flanges 221. The two side flanges 221 are spacedly arranged and connected to the second fitting portion 23. The wall fixing plate 10 has two side portions 17, the two side portions 17 are connected between the top portion 11 and the bottom portion 12. During moving the wall hanging element 20 between the fixed position and the released position, the wall fixing plate 10 can be disposed between the two side flanges 221, and the two side portions 17 are close to or in contact with the two side flanges 221. Therefore, during the movement, the wall fixing plate 10 can be guided and limited by the two side flanges 221 to prevent the deflection or wobbling.

As shown in FIG. 4, the limiting member 25 further comprises a third limiting block 28. The second limiting block 27 is between the first limiting block 26 and the third limiting block 28, and a portion of the arc connecting section 35 is between the second limiting block 27 and the third limiting block 28. In this embodiment, the second arc section 352 of the arc connecting section 35 is connected between the first arc section 351 and the inner arc section 31, and a portion of the second arc section 352 is between the second limiting block 27 and the third limiting block 28. Accordingly, as shown in FIG. 4 and FIG. 6, during the process that the spiral spring 30 is released and compressed, the arc connecting section 35 can be limited between the second limiting block 27 and the third limiting block 28, thus preventing the unexpected movements of the spiral spring 30.

As shown in FIG. 3 to FIG. 5, the spring installation region 24 on the back surface 22 of the housing 21 further comprises a stopping plate 40 and a limiting post 41, so that the spiral spring 30 can be limited in the spring installation region 24. In this embodiment, the limiting post 41 is connected between the stopping plate 40 and the housing 21. In this embodiment, one of two ends of the limiting post 41 is fixed on the housing 21 through attaching, locking, engaging or the like, and the other end of the limiting post 41 is integrally connected to the stopping plate 40, so that the stopping plate 40 is kept spaced from the back surface 22 of the housing 21 by a spacing. The inner arc section 31 surrounds the limiting post 41, and the stopping plate 40 covers the spiral spring 30 to limit the axial movement of the spiral spring 30, thus preventing the spiral spring 30 from leaving the spring installation region 24 easily.

Further, as shown in FIG. 5, when the wall hanging element 20 is at the fixed position, a portion of the wall fixing plate 10 is further inserted into the spacing between the stopping plate 40 and the back surface 22. Therefore, after the wall hanging element 20 is assembled with the wall fixing plate 10, the wall hanging element 20 can be stably fixed and is not wobbled easily. Moreover, as shown in FIG. 7, when the wall hanging element 20 is at the released position, the stopping plate 40 corresponds to the via hole 15 of the wall fixing plate 10. Therefore, the spiral spring 30, the stopping plate 40, and the limiting post 41 can be detached from the wall fixing plate 10 through the via hole 15.

As shown in FIG. 4 and FIG. 8, the spiral spring 30 has a longitudinal center line L passing through a center of circle C of the inner arc section 31. The outer arc section 33 has a terminal portion 331 and a connection end 332. The connection end 332 is connected to the arc connecting section 35. The terminal portion 331 extends away from the connection end 332, and the terminal portion 331 of the outer arc section 33 is adjacent to the longitudinal center line L. The term "adjacent to", in this embodiment, may indicate that, the angle θ between the connection line of the terminal portion 331 and the center of circle C and the longitudinal center line L is in a range between 0 degree and 45 degrees or between 15 degrees and 30 degrees. Moreover, in this embodiment, the connection end 332 and the terminal portion 331 of the outer arc section 33 are respectively at two opposite sides of the longitudinal center line L. Therefore, when the wall hanging element 20 is at the fixed position, the abutting portion 16 can be ensured to abut against the outer arc section 33 of the spiral spring 30 to move toward the inner arc section 31. However, it is understood that, the foregoing embodiment are provided as illustrative purposes; in some embodiments, the connection end 332 and the terminal portion 331 of the outer arc section 33 may be at the same side of the longitudinal center line L. In another embodiment, alternatively, the terminal portion 331 of the outer arc section 33 may be on the longitudinal center line L.

Based on the above, in the hanging device according to one or some embodiments of the instant disclosure, the wall hanging element can be quickly assembled on the wall fixing plate through the fixing member and the second fitting portion. Furthermore, after the fixing member is detached from the wall fixing plate, the elastic force stored in the spiral spring drives the wall hanging element to move with respect to the wall fixing plate, so that the wall hanging element can be detached from the wall fixing plate easily and conveniently. Moreover, when the spiral spring is compressed, the inner stress applied to the spiral spring can be distributed over the entire spring properly, thereby increasing the yield strength and the service life of the spiral spring. Furthermore, owing to the snail-like structure of the spiral spring, after the spiral spring is released, the spiral spring can have a longer actuation movement to provide a greater elastic force. Hence, even in a narrow space, the elastic force generated by the spiral spring and the actuation movement of the spiral spring can be ensured enough to drive the wall hanging element to move from the fixed position to the released position.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A hanging device comprising:
a wall fixing plate comprising a fixing portion, an abutting portion, and a first fitting portion;
a wall hanging element comprising a housing and a fixing member, wherein the housing has a back surface, the back surface has a spring installation region and a second fitting portion, and the second fitting portion is detachably fitted with the first fitting portion; the fixing member protrudes from the back surface and is detachably assembled on the fixing portion; a distance between the fixing member and a bottom edge of the spring installation region is greater than a distance between the fixing portion and the abutting portion of the wall fixing plate; and
a spiral spring disposed on the spring installation region, wherein the spiral spring comprises an inner arc section, an outer arc section, and an arc connecting section; a radius of the outer arc section is greater than a radius of the inner arc section, the arc connecting section is connected between the inner arc section and the outer arc section, and a radius of curvature of the arc connecting section gradually increases from the inner arc section to the outer arc section.

2. The hanging device according to claim 1, wherein when the wall hanging element is assembled on the wall fixing plate and at a fixed position, the abutting portion abuts against the outer arc section to move toward the inner arc section, so that the spiral spring stores an elastic force; when the fixing member is detached from the fixing portion, the elastic force drives the wall hanging element to move with respect to the wall fixing plate to be at a released position; the second fitting portion is detached from the first fitting portion when the wall hanging element is at the released position.

3. The hanging device according to claim 2, wherein the spring installation region further has a stopping plate and a limiting post; the limiting post is connected between the stopping plate and the housing, so that the stopping plate is kept spaced from the back surface by a spacing; the inner arc section surrounds the limiting post, and the stopping plate covers the spiral spring.

4. The hanging device according to claim 3, wherein when the hanging element is at the fixed position, a portion of the wall fixing plate is further inserted into the spacing.

5. The hanging device according to claim 1, wherein the spring installation region has a limiting member, and the spiral spring leans against the limiting member.

6. The hanging device according to claim 5, wherein the limiting member comprises a first limiting block and a second limiting block; the first limiting block has a first top edge and a first bottom edge, the second limiting block has a second top edge and a second bottom edge, and an indentation is between the first limiting block and the second limiting block; the arc connecting portion of the spiral spring leans against the first top edge and the second top edge, the inner arc section leans against the first bottom edge, and an end portion of the inner arc section has an extension section inserted into the indentation.

7. The hanging device according to claim 6, wherein the first bottom edge is an arc edge, and a radius of curvature of the first bottom edge corresponds to a radius of curvature of the inner arc section.

8. The hanging device according to claim 6, wherein the first top edge and the second top edge are arc edges.

9. The hanging device according to claim 8, wherein the arc connecting section comprises a first arc section and a second arc section, and a radius curvature of the first arc section is greater than a radius curvature of the second arc section; the first arc section leans against the first top edge, and a radius of curvature of the first top edge corresponds to a radius of curvature of the first arc section; the second arc section leans against the second top edge, and a radius of curvature of the second top edge corresponds to a radius of curvature of the second arc section.

10. The hanging device according to claim 6, wherein the limiting member comprises a third limiting block, the second limiting block is between the first limiting block and the third limiting block, and a portion of the arc connecting section is between the second limiting block and the third limiting block.

11. The hanging device according to claim 1, wherein the wall fixing plate has a via hole, the spiral spring is in the via hole, and the abutting portion is a hole edge portion of the via hole.

12. The hanging device according to claim 1, wherein the spiral spring has a longitudinal center line passing through a center of circle of the inner arc section, and a terminal portion of the outer arc section is adjacent to the longitudinal center line.

13. The hanging device according to claim 12, wherein the outer arc section has a connection end connected to the arc connecting portion, and the connection end and the terminal portion are respectively at two opposite sides of the longitudinal center line.

14. The hanging device according to claim 1, wherein the wall fixing plate comprises a top portion and a bottom portion, the first fitting portion is an edge portion of the top portion, and the second fitting portion is a buckling flange disposed on the back surface.

* * * * *